Patented Aug. 24, 1926.

1,596,979

UNITED STATES PATENT OFFICE.

VOLKMAR KOHLSCHÜTTER, OF BERN, SWITZERLAND.

PROCESS FOR MANUFACTURING FINELY-DIVIDED SOLID SUBSTANCES.

No Drawing. Application filed August 30, 1921, Serial No. 497,021, and in Germany August 4, 1919.

The applicability of many solid substances in the chemical industry is due to the fact that these substances are obtained in the form of a high grade of dispersion.

Such finely divided substances are intended to be employed as contact substances for gaseous reactions or as adsorption means for clarifying liquids and for precipitating dissolved substances, as mineral colours, opaquing means or as medicaments. They can be produced in different manners, so that one and the same chemical individual may be obtained in a finely divided state in several ways, for instance by precipitating it from a diluted solution or by decomposing solid compositions of a higher molecular weight in the heat or finally by a pseudomorphous change of solid substances in solutions of the reacting materials.
The grade of dispersion of one and the same substance manufactured according to different methods is, though generally characterized by the words "finely divided", not always equal. On the contrary, any method impresses special properties on the substance, owing to the co-operation of physical and chemical factors within the substance. On the other hand the varying purposes, for which finely divided substances are used, demand varying properties which in some cases can be imparted to the substance only by the forming process itself and not by an additional treatment. In such a case the evident looseness of the product does not always determine its applicability, on the contrary in most cases the grade of dispersion shows deeper lying differences, which are decisive.

Now, according to the present invention a special kind of dispersion of solid substances may be obtained by firstly producing these substances as finely divided systems in a gaseous medium and then compressing them in this medium, whereby it is necessary to conserve the original dimensions of the particles as far as possible.

This result will be obtained by firstly producing the substances in question as smoke and then precipitating the latter by means of an electric treatment for instance by a point or corona discharge. Such an electric precipitating process is very well known to the art. The solid smoke particles absorb gas-ions, when they pass a discharging field, and they are therefore quickly precipitated on a collecting electrode connected to the earth. By this process the smoke particles are partly conglomerated and the solids will be separated in a close and handy form.
However, the primary grade of dispersion will be extensively retained within the secondary dust particles and consequently within the precipitated pulverous mass, in such a manner that solid products are formed, the interior structure of which is of a high grade of dispersion.

The process can be used with respect to all substances which are able to be vaporized and condensed again to the solid state. However, it can especially be carried out in such a manner that primarily a substance different from the end-product will be produced in the form of vapour, whereupon the latter will be chemically converted into smoke corresponding to the end-product. So it is possible for instance to directly vaporize elementary substances or compositions and to precipitate these substances afterwards. Moreover, it is possible to vaporize a metal and to convert this metal at the same time into an oxide, which then forms the smoke to be precipitated. Other substances, for instance the oxides of certain heavy metals, may be obtained in a high grade of dispersion by producing them together with other oxides in the form of smoke which process can be carried out by subjecting their compositions or alloys together with aluminium, titanium, tin, silicium, vanadium, etc., to a blowing process. In such a case the oxides of these metals are used as carrying substances so that products of a high chemical and catalytic activity are obtained. In this manner oxides, for instance oxides of nickel and oxides of iron mixed with oxide of aluminium, oxide of silicium, oxide of titanium, etc., are reduced to pyrophoric products at extraordinary low temperatures.

In order to carry out the invention the evaporatic is produced for instance by subjecting the substances to a blowing process with air or dioxide of carbon in a smoke generating furnace. Such oxides of metal are preferably produced by melting down the metals or their carbides in a luminous arc, whereas with respect to other more volatile substances other heating means can be used. From the smoke generating furnace the smoke preferably is led to a wide room, in which it will be rendered homogeneous by means of a whirling motion and from this room it is directed to the electric precipitating room, which is constructed in a known manner.

The process according to the present invention will clearly be shown by the following examples:

1. Metallic tin is melted in an electric arc-furnace and afterwards a constant air stream is blown upon the reguline surface of the bath. By this means the metal is oxidized and the oxide produced is converted into vapour, which is then condensed to a strong smoke. The material precipitated at a voltage of 15000 to 20000 is totally pure, it shows a white colour with a gray-yellow tinge and has a loose and flocculent shape. Its high grade of dispersion can easily be proved by treating it with very dilute $$\left(\frac{n}{50} \text{ to } \frac{n}{100}\right)$$

ammonia or hydrochloric acid. The result is a milky colloidal solution of a yellow tinge. Besides, this material is able to remove, in a like manner as colloidal metastannic acid, phosphoric acid from a nitric acid solution. If the loose mass is heated, it is reduced to a small volume without loosing its high grade of dispersion. Consequently, this product is especially capable to serve as opaquing means for glass and enamel.

2. When metallic bismuth is heated and a stream of air is blown upon it, it will be converted into a strong smoke of oxide, which can be precipitated as a loose brilliant lemon-coloured mass. This product shows all qualities, which render it applicable to china-painting in place of the bismuth-ochre, used up to the present for this purpose.

3. In order to produce oxides of metals on carriers for contact substances, electrically fused ferrotitanium or ferro-vanadium is subjected to a blowing process. By this means substances are produced of a varying percentage of iron, showing a pyrophoric character after their reduction in a stream of hydrogen, provided they have more than 30% of iron. The finely divided state of the oxide of iron in these substances furthermore results from the fact, that already by the treatment with water a colloidal subdivision is obtained.

If alloys of nickel and aluminium will be treated in the same manner as above, mixtures of oxides are produced, which can directly be used as contact substances, though their percentage of nickel is not higher than 20%.

Having now particularly described and ascertained the nature of my said invention and in what manner the same is to be performed, I declare that what I claim is:—

1. A process for manufacturing finely divided solid substances which consists in vaporizing all the substances and producing them in form of finely divided systems in a gaseous media and electrically precipitating them from this media.

2. A process for manufacturing finely divided solid substances, which consists in directly vaporizing elementary substances and recovering them as solids of a high grade of dispersion by means of an electrical precipitation.

3. A process for manufacturing finely divided solid substances, which consists in directly vaporizing metal oxides and recovering them as solids of a high degree of dispersion by means of an electrical precipitation.

4. A process for manufacturing finely divided solid substances, which consists in directly oxidizing and vaporizing elementary metallic substances, converting the vapour into smoke and recovering the solids from the smoke by electrical precipitation.

5. A process for manufacturing finely divided solid substances, which consists in vaporizing a mixture of substances under oxidizing conditions, whereby oxides are formed and electrically precipitating this mixture in such a manner that a relatively indifferent component is caused to form the carrier for an active component.

6. A process of making very fine metal oxid which comprises melting a metal-containing material, and directing a blast of oxidizing gas against the same while at a temperature at which such metal will oxidize and the oxide will volatilize, and thereafter subjecting the fume to electrical precipitation.

7. A process of making very fine metal oxid which comprises melting a metal-containing material containing metallic tin, and directing a blast of oxidizing gas against the same while at a temperature at which such metal will oxidize and the oxide will volatilize, and thereafter subjecting the fume to electrical precipitation.

8. A process of making very fine metal oxid which comprises melting a metal-containing material containing a metal having a relatively low melting and boiling point, and directing a blast of oxidizing gas against the same while at a temperature at which such metal will oxidize and the oxide will volatilize, and thereafter subjecting the fume to electrical precipitation.

9. The process for the production of finely subdivided solid substances of a high degree of dispersion, which consists in first producing these substances in the form of finely dispersed systems in a gaseous medium, by heating said substances considerably above the temperatures at which fumes are ordinarily formed (thereby producing substantially only vapors without fumes in said gaseous medium), and then condensing said vapors from said medium into fumes, and precipitating said substances from said medium by electrical precipitation.

10. The process for the production of finely subdivided solid substances of a high degree of dispersion, which consists in first producing these substances in the form of finely dispersed systems in a gaseous medium, by heating elementary substances under oxidizing environment, to considerably above the temperature at which fumes are ordinarily formed, thereby producing substantially only vapors without fumes in said gaseous medium, and then condensing said vapors from said medium into fumes, and precipitating said substances from said medium by electrical precipitation.

11. The process for the production of finely subdivided solid substances of a high degree of dispersion, which consists in first producing these substances in the form of finely dispersed systems in a gaseous medium, by heating metal containing compositions under oxidizing environment, to considerably above the temperature at which fumes are ordinarily formed thereby producing substantially only vapors without fumes in said gaseous medium, and then condensing said vapors from said medium into fumes, and precipitating said substances from said medium by electrical precipitation.

12. The process for the production of finely subdivided solid substances of a high degree of dispersion, which consists in first producing these substances in the form of finely dispersed systems in a gaseous medium, by heating elementary substances considerably above the temperature at which fumes are ordinarily formed thereby producing substantially only vapors without fumes in said gaseous medium, and then condensing said vapors from said medium into fumes by means of a chemical reaction, and precipitating said substances from said medium by electrical precipitation.

13. The process for the production of finely subdivided solid substances of a high degree of dispersion, which consists in first producing these substances in the form of finely dispersed systems in a gaseous medium, by heating compositions considerably above the temperature at which fumes are ordinarily formed thereby producing substantially only vapors without fumes in said gaseous medium, and then condensing said vapors from said medium into fumes by means of a chemical reaction, and precipitating said substances from said medium by electrical precipitation.

14. The process for the production of finely subdivided solid substances of a high degree of dispersion, which consists in first producing these substances in the form of finely dispersed systems in a gaseous medium, by heating a mixture of substances considerably above the temperature at which fumes are ordinarily formed thereby producing substantially only vapors without fumes in said gaseous medium, and then condensing said vapors from said medium by electrical precipitation, so that indifferent components are the carriers for other components.

Dr. VOLKMAR KOHLSCHÜTTER.